(12) United States Patent
Jansen et al.

(10) Patent No.: US 10,710,001 B2
(45) Date of Patent: Jul. 14, 2020

(54) COLUMN WITH AT LEAST ONE PARTITION

(71) Applicant: JULIUS MONTZ GmbH, Hilden (DE)

(72) Inventors: Helmut Jansen, Dornagen (DE); Thomas Rietfort, Bottrop (DE); Egon Zich, Leichlingen (DE)

(73) Assignee: JULIUS MONTZ GmbH, Hilden (DE)

( * ) Notice: Subject to any disclaimer, the term of this patent is extended or adjusted under 35 U.S.C. 154(b) by 99 days.

(21) Appl. No.: 15/753,200

(22) PCT Filed: Oct. 26, 2016

(86) PCT No.: PCT/EP2016/001779
§ 371 (c)(1),
(2) Date: Feb. 16, 2018

(87) PCT Pub. No.: WO2017/084734
PCT Pub. Date: May 26, 2017

(65) Prior Publication Data
US 2018/0243664 A1 Aug. 30, 2018

(30) Foreign Application Priority Data

Nov. 16, 2015 (DE) .......................... 10 2015 014 708

(51) Int. Cl.
*B01D 3/32* (2006.01)
*B01D 3/14* (2006.01)
*B01D 3/00* (2006.01)

(52) U.S. Cl.
CPC ............. *B01D 3/141* (2013.01); *B01D 3/009* (2013.01); *B01D 3/32* (2013.01)

(58) Field of Classification Search
CPC ........... B01D 3/009; B01D 3/141; B01D 3/32
USPC ...................... 261/96, 97, 109, 110; 202/158
See application file for complete search history.

(56) References Cited

U.S. PATENT DOCUMENTS

| | | | | |
|---|---|---|---|---|
| 5,914,012 | A | * | 6/1999 | Kaibel ..................... B01D 3/14 202/158 |
| 6,645,350 | B1 | | 11/2003 | Steacy |
| 6,770,173 | B1 | | 8/2004 | Jansen |
| 7,287,747 | B2 | | 10/2007 | Zich |

(Continued)

FOREIGN PATENT DOCUMENTS

| | | |
|---|---|---|
| CN | 1177513 A | 4/1998 |
| CN | 2579490 Y | 10/2003 |

(Continued)

OTHER PUBLICATIONS

International Search Report and Written Opinion for International Application No. PCT/EP2016/001779, dated Feb. 13, 2017, pp. 9.

(Continued)

*Primary Examiner* — Charles S Bushey

(57) ABSTRACT

The invention relates to a column for carrying out thermal separations and/or chemical reactions, including a vertical cylindrical column outer wall that surrounds an inner chamber divided by at least one vertical separating wall into chambers, wherein the separating wall has at least two vertical separating wall elements that are arranged one above the other in the same plane, adjoin one another edge to edge, and are interconnected by at least one screw connection.

9 Claims, 3 Drawing Sheets

(56) References Cited

U.S. PATENT DOCUMENTS

Figure 1:
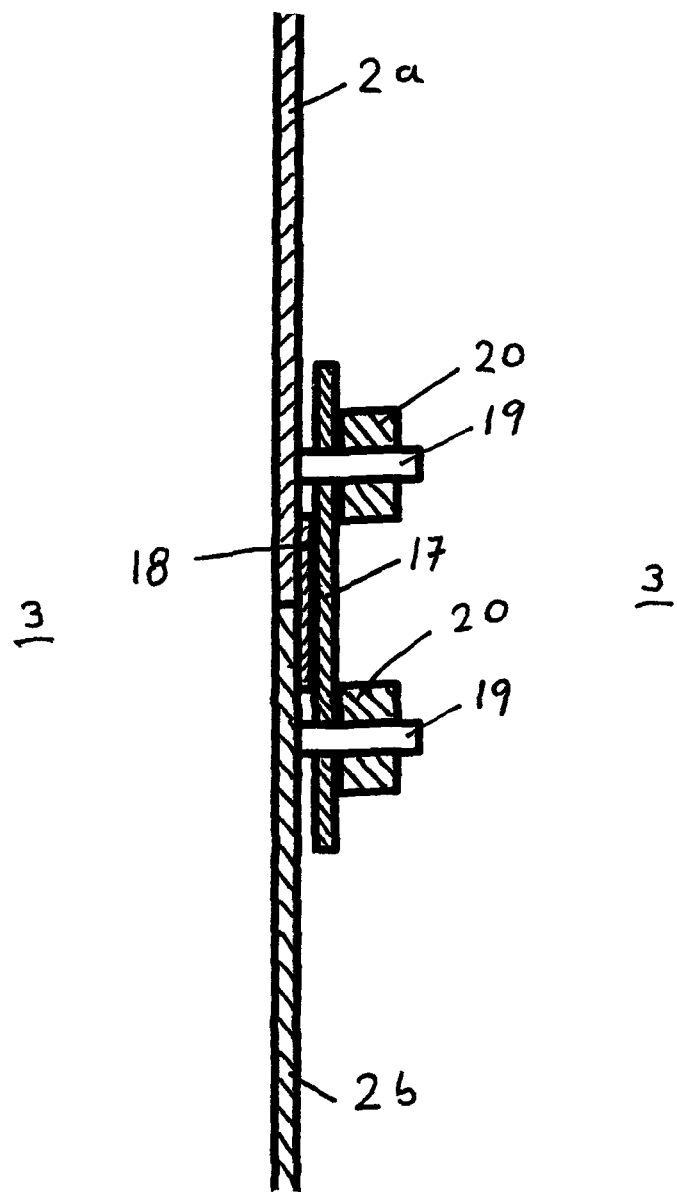

| 7,604,222 | B2 * | 10/2009 | Zone | B01D 3/14 |
| | | | | 202/158 |
| 9,273,261 | B2 | 3/2016 | Favilli | |
| 9,550,133 | B2 | 1/2017 | Favilli | |
| 2013/0267751 | A1 | 10/2013 | Favilli et al. | |
| 2014/0005458 | A1 | 1/2014 | Favilli et al. | |

FOREIGN PATENT DOCUMENTS

| CN | 102596347 A | 7/2012 |
| CN | 102143787 B | 12/2013 |
| DE | 2619592 A | 11/1977 |
| EP | 1088577 A1 | 4/2001 |
| EP | 1647318 B1 | 8/2010 |
| EP | 1390111 B1 | 11/2010 |
| JP | H10033901 A | 2/1998 |
| JP | 2001104701 A | 4/2001 |
| JP | 2004531385 A | 10/2004 |
| JP | 2006138392 A | 6/2006 |
| WO | 1999001193 A | 1/1999 |

OTHER PUBLICATIONS

JP Decision to Grant in JP Application No. 2018-524738, dated Jan. 28, 2020, pp. 5.

* cited by examiner

COLUMN WITH AT LEAST ONE PARTITION

CROSS REFERENCE TO RELATED APPLICATIONS

This application is the US-national stage of PCT application PCT/EP2016/001779 filed 26 Oct. 2016 and claiming the priority of German patent application 102015014708.0 itself filed 16 Nov. 2015.

The invention relates to a column for carrying out thermal separations and/or chemical reactions comprising a vertical cylindrical column outer wall enclosing an inner chamber that is subdivided into chambers by at least one vertical partition.

When separating feedstock mixtures into more than two fractions, columns with vapor or liquid sidestreams are frequently used in order to keep plant and equipment expenditure within bounds. The drawn off side products are in general never entirely pure, i.e. these products are usually contaminated with other substances that are not entirely separable. Use is made of partitioned columns in order to obtain side products in pure form.

It is known to use partitions in a column in order to subdivide the inner chamber of the column into subchambers. It is accordingly known from EP 1088577 [U.S. Pat. No. 6,770,173] and EP 1390111 [U.S. Pat. No. 7,287,747] to arrange dividing means in a subchamber of distillation columns, below and/or above the feed point of the substance mixture to be separated and the side discharge, in order to prevent cross-mixing of a liquid and/or vapor stream. These partitions divide the interior of the column into a feed part, where the substance mixture to be separated enters, and a discharge part, from which one or more sidestreams exit. These internals are intended to prevent low- and high-boiling components from passing from the feed part into the discharge part. Practical application of the above-stated inventions has revealed that, in the event of elevated pressure on the feed side, gas and liquid can pass through the partition seal into the draw-off side.

The known columns also fail to achieve the desired purity in the case of very stringent product purity requirements in the sidestream (impurities in the ppm range).

The object of the invention is to provide a structural development of the partition which simplifies and reduces the cost of installing the partition in the column, that, by dispensing with additional machinery, reduces the risk of injury to installers and that provides very high tightness between the column subchambers and between the column inner wall and the partition.

Said object is achieved according to the invention in that the partition comprises at least two vertical partition plates that are arranged one above the other in the same plane, adjoin one another in abutting manner and are connected together by at least one screw fastening.

The advantages achieved with the invention in particular consist in that a partition that is assembled from a plurality of partition plates can be produced. The partition is thus individually adaptable to the size of the column. Installation of the partition in the column is simple. The individual partition plates are relatively light due to their dimensions. The partition can therefore be assembled solely by human labor, without involving the use of additional machinery, so achieving considerable cost savings and distinctly reducing the risk of injury to installation personnel.

This type of assembly of the partition likewise avoids any damage occurring to the partition or to the column, in particular to the column inner wall. The light weight of the individual partition plates and their smaller dimensions in comparison with the internal diameter of the column permit installation without jamming or bumping, whereby damage is prevented. Furthermore, better tightness between the column inner wall and partition can be achieved thanks to the individual adaptation. It is likewise advantageous that the individual partition plates can have different widths and heights, whereby any desired width or height of the partition can be achieved on assembly.

Screw fastening permits simple assembly of the individual partition plates. Connecting the partition plates by at least one screw fastening ensures that the individual partition plates hold together strongly and securely.

It has been possible to demonstrate in tests that the new multipart, screw fastened partition is capable of reducing the gas leakage rate from 3 vol. % to <0.001 vol. % and the liquid leakage rate from 2.8 to zero vol. % relative to the gas and liquid load of the portion of the partition.

This is achieved by constructing the joint between the multipart metal dividing sheets as follows:
- abutting assembly
- seal and pressure plate or metal strips over the abutment fastening with Peco studs/no opening in the sheet metal
- continuous smooth sealing surface for fastening to the clamping bar of the column
- embodiment with a plurality of parallel partitions also possible.

It is particularly advantageous for a vertical metal strip to be fastened horizontally on the opposite rear face of the partition plate to the screw fastening, which metal strip projects beyond the upper horizontal edge of the one partition plate and is located interlockingly in a groove that is formed by a further vertical metal strip that is fastened horizontally to the rear face of the other partition plate. Assembly of the partition plates is substantially facilitated as a consequence. In particular in the case of large column diameters, additional guidance of the partition plates relative to one another is provided while they are being fitted together prior to screw fastening. The stability of the partition during and after assembly is also increased.

Advantageous configurations of the invention are set out in the further subclaims.

Figure 2:
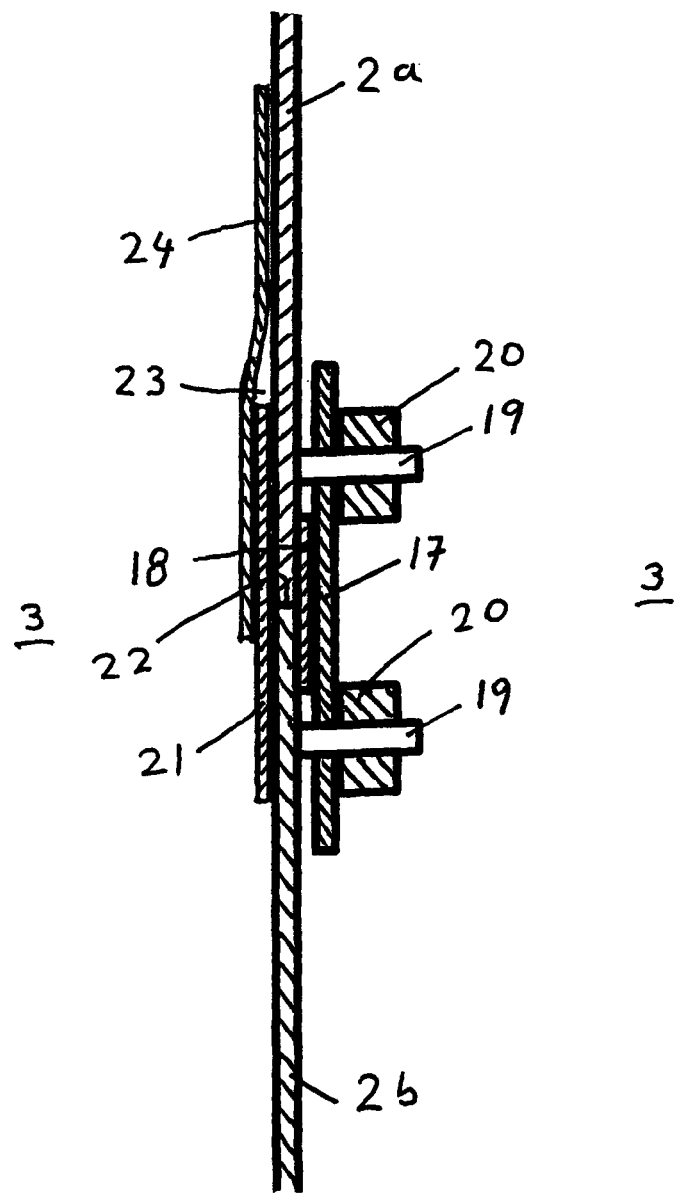
Figure 3:
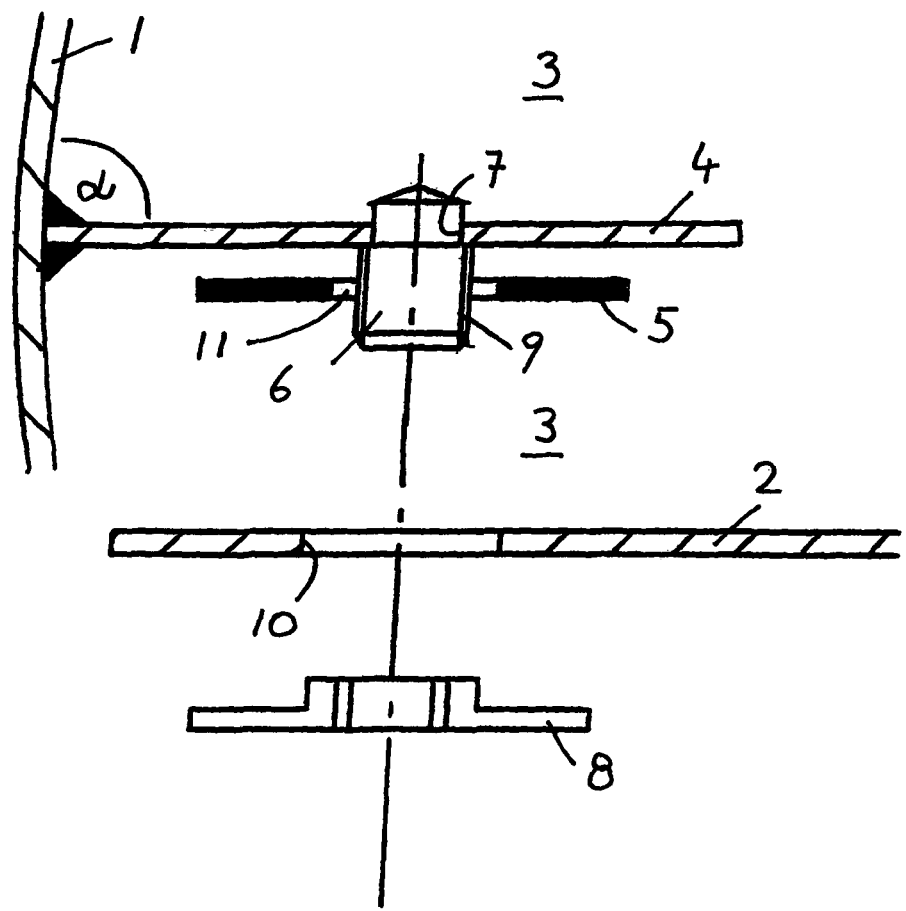

Embodiments of the invention are explained in greater detail below and illustrated in the drawings, in which:

FIG. 1 is a vertical section through a vertical partition with two partition plates arranged one above the other, FIG. 2 shows the structure of FIG. 1 with additional metal strips on the rear face of the partition for guiding the partition plates during assembly, FIG. 3 is a horizontal section through the fastening point of a partition to the column outer wall.

A column with a cylindrical outer wall 1 made of sheet metal is subdivided into at least two subchambers using a vertical partition 2 that comprises at least two vertical partition plates 2a, 2b arranged one above the other which are aligned with one another, wherein partition plate 2a abuts against partition plate 2b without forming a gap. It is of significance that the horizontal lower edge 15 of the upper partition plate 2a abuts against the horizontal upper edge 16 of the lower partition plate 2b and that studs 19 fastened close to the abutment point on the side faces on both partition plates 2a, 2b project out horizontally, onto which studs at least one metal strip 17 is fastened in such a manner that the metal strip 17 bridges the abutment point in sealing manner as a cover strip. The same applies if two partition plates with their vertical edges/sides in abutment such that there is substantially no gap therebetween.

The studs 19 that pass through the metal strip 17 each have an external thread onto which are screwed nuts 20 that press the metal strip 17 or a pressure strip 17 onto the junction (abutment region) between the partition plates 2a, 2b. A sealing strip 18, preferably of polytetrafluoroethylene (PTFE) or graphite, is located beneath the metal strip/pressure strip 17.

FIG. 2 shows an embodiment in which vertical metal strips 21, 24 are fastened horizontally and thus parallel to the upper horizontal edge 22 to the rear face of the partition (i.e. on the side of the wall from which no studs 19 project). On the rear face of the lower partition plate 2b, the metal strip 21 is here welded or adhesively bonded to the rear face such that the lower region of the metal strip 21 lies against the rear face of the partition plate and the upper region projects vertically above the upper edge (upper horizontal edge) 22. This vertically projecting region is located in a groove 23 that is formed by a further vertical metal strip 24 that is welded or adhesively bonded with its upper region on the rear face of the upper partition plate 2a and the lower region of which is spaced from the rear face of the partition plate in order to form the groove 23.

A partition 2 is fastened in the column, as shown in FIG. 3, by welding a metal strip 4 to each of the mutually opposing sides on the inner side of the column outer wall 1, wherein the metal strip extends vertically in the longitudinal extent thereof and projects out substantially at right angles from the inner side of the column outer wall 1. This angle α is 90 degrees if the partition 2 divides the column inner chamber into two identically sized chambers. If, on the other hand, the inner chamber 3 of the column is divided into three or more chambers by two or more partitions, the angle α often differs from 90 degrees.

The partition 2 as a metal sheet is screwed on its vertical edge to the metal strip 4. To this end, studs 6 regularly spaced apart from one another are fastened to the metal strip 4. The stud 6 here comprises an external thread 9 and extends through an opening 10 in the partition 2, such that a nut 8 is screwed onto the outer end of the stud 6 in order to hold the partition 2 securely in a sealed manner on the metal strip 4. The reliability of the seal can be further increased by inserting a sealing strip 5 between the partition 2 and the metal strip 4, which sealing strip extends over the entire length of the metal strip 4 and the height of the partition 2 and comprises openings 22 at the level of the studs to permit the latter to pass through the openings. The sealing strip 5 preferably consists of polytetrafluoroethylene or graphite.

The following different fastening methods are suggested for fastening the studs 6 to the metal strip 4:

Firstly, the studs 6 can be welded to the metal strip 4 by resistance welding, such that it is not necessary to make openings in the metal strip 4. Alternatively, the metal strip 4 may comprise internally threaded bores 7 in which the externally threaded stud 6 finds purchase. It is, however, furthermore also possible to weld the stud into the bore 7 in the metal strip.

FIG. 1, FIG. 2, and FIG. 3 show just one partition 2. The column inner chamber 3 may, however, also instead be subdivided into three or more subchambers by two or more partitions 2, wherein the partitions extend parallel to one another. Each partition 2 preferably consists of two or more parts, which are each connected to one another by metal sealing sheets in particular via screwed joints, such that the individual partition parts can easily be introduced into the interior through the column manhole as individual metal sheets.

The invention claimed is:

1. A column for carrying out thermal separations and/or chemical reactions, the column comprising:
   a vertical cylindrical outer wall defining an inner chamber;
   a vertical partition subdividing the inner chamber into subchambers, the partition having a front face and an opposite rear face and being formed by vertical upper and lower plates that are one above the other in a respective common plane and that vertically abut each other at a horizontal joint between a lower edge of the upper plate and an upper edge of the lower plate;
   screw fasteners on the front face of the partition and connecting the plates of the partition together; and
   a first metal strip extending horizontally, fixed to one of the plates on the rear face of partition, and having an edge projecting vertically in one direction past the joint; and
   a second metal strip extending horizontally, fixed to the other of the plates on the rear face of the partition, and forming with the respective other plate a groove opening vertically oppositely to the one direction and receiving the edge of the first strip of the respective plate.

2. The column defined in claim 1, wherein the fasteners of the partition include an upper fastener on the respective upper plate and a lower fastener on the respective lower plate, the column further comprising:
   a third metal strip extending across and along the joint and secured at the front face to the upper fastener and the lower fastener.

3. The column defined in claim 2, further comprising:
   a sealing strip compressed between the third metal strip and the front face at the respective joint.

4. The column defined in claim 2, wherein each of the screw fasteners is formed by:
   an externally threaded stud fixed to and projecting from the respective plate; and
   a nut threaded on the stud and pressing the third strip against the respective plate.

5. The column defined in claim 4, wherein the studs are welded to and project perpendicularly from the respective plates.

6. The column defined in claim 1 wherein the partition has a pair of vertical edges juxtaposed with an inner surface of the outer wall, the column further comprising:
   vertical fourth metal strips fixed to the inner surface and angularly juxtaposed with the edges; and
   screw fasteners securing the edges to the respective fourth metal strips.

7. The column defined in claim 6, further comprising:
   respective seal strips compressed between the edges and the respective fourth metal strips.

8. The column defined in claim 7, wherein each sealing strip is made of polytetrafluoroethylene or graphite.

9. The column defined in claim 1, wherein the column inner chamber is subdivided into three or more of the subchambers by two or more of the partitions.

* * * * *